United States Patent [19]

Stode

[11] 4,058,015
[45] Nov. 15, 1977

[54] CONTAMINATION TRAP FOR PRESSURE GAUGES

[75] Inventor: Ralph A. Stode, Ponca City, Okla.

[73] Assignee: Continental Oil Company, Ponca City, Okla.

[21] Appl. No.: 757,813

[22] Filed: Jan. 10, 1977

[51] Int. Cl.² ............................................. G01L 7/00
[52] U.S. Cl. ...................................... 73/395; 73/392; 73/394
[58] Field of Search ................. 73/392, 394, 395, 420

[56] References Cited

U.S. PATENT DOCUMENTS

| | | | |
|---|---|---|---|
| 1,622,843 | 3/1927 | Price et al. | 73/392 |
| 1,868,018 | 7/1932 | Miner | 73/395 |
| 1,912,954 | 6/1933 | Thompson | 73/394 |

Primary Examiner—Donald O. Woodiel
Attorney, Agent, or Firm—Cortlan R. Schupbach, Jr.

[57] ABSTRACT

Pressure sensors or pressure gauges are protected from water and other foreign materials by a pressure sensitive contamination trap comprising a sealed vessel containing a first fluid, said vessel having an intake conduit to the vessel interior above the level of the first fluid and buffer tube filled with a second fluid, said buffer tube projecting below the level of the first fluid, said second fluid being in contact with said first fluid at one end of the buffer tube and with a pressure sensor at the other end of the buffer tube. The second fluid is of a lower specific gravity and immiscible with the first fluid. The two fluids are preferably chemically inert with respect to each other.

4 Claims, 1 Drawing Figure

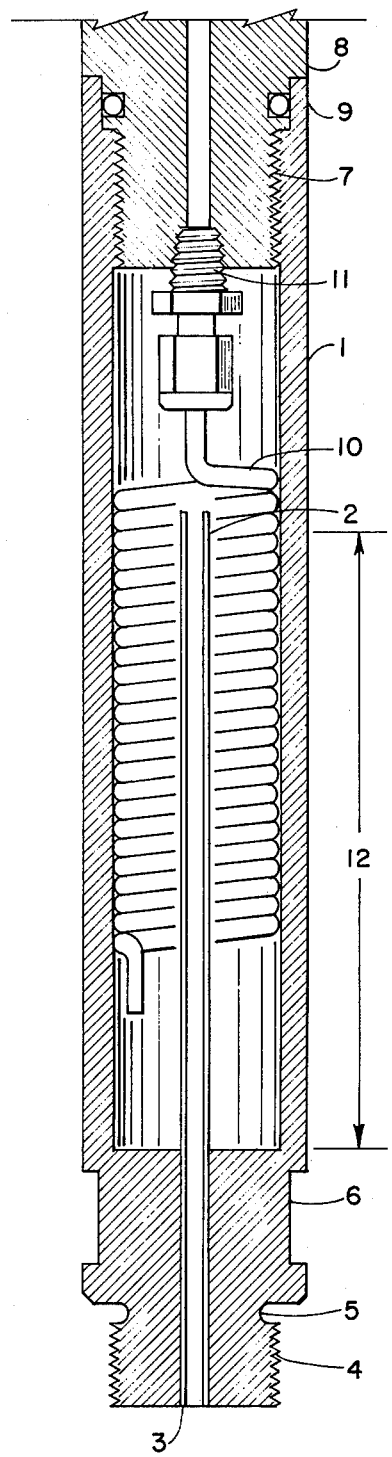

CONTAMINATION TRAP FOR PRESSURE GAUGES

This invention relates to a gauge protective device. More particularly, this invention relates to a gauge protective device for use where the pressure sensor must be protected from water and other foreign materials, such as in oil well applications, and allow an accurate pressure reading to be taken while preventing contaminants from contacting the pressure sensor.

It has long been known that contaminants destroy pressure sensors or render them inaccurate. Many efforts have been made to alleviate this problem. Among these methods are those described in U.S. Pat. Nos. 2,369,707; 2,580,999; 3,807,232; and 3,831,449. These patents collectively teach the separation of contaminants from pressure sensors using diaphragms, wherein the diaphragms move under the influence of pressure and transmit further to the pressure sensors. However, these patents have many drawbacks well known to those skilled in this art. For example, under extremely high pressure, the diaphragm can rupture, transmitting sudden force to the pressure sensors and allowing contaminants to reach the sensors. In addition, the diaphragm damps or reduces the effect of the pressure, thus making direct and accurate readings unobtainable.

An attempt to alleviate the rupture problem was described in U.S. Pat. No. 3,415,123, wherein a piston replaced the diaphragm, making rupture unlikely. However, the piston is, if anything, more insensitive to the effects of pressure than is the diaphragm, since a larger weight must be moved with concurrent friction effects.

It would therefore be of great benefit to provide a method whereby contaminants could be prevented from reaching pressure sensors while providing a direct and accurate reading of the pressure.

It is therefore the object of the present invention to provide an improved contaminant trap for pressure sensors. Other objects will become apparent to those skilled in this art as the description proceeds.

It has now been discovered in accordance with the present invention that contaminants can be prevented from reaching pressure sensors while providing direct and accurate pressure readings by using the contamination trap described herein.

A pressure sensitive contamination trap to protect pressure sensors from water and other foreign materials is provided, comprising a sealed vessel containing a first fluid, said vessel having an intake conduit to the vessel interior above the level of the first fluid, and a buffer tube filled with a second fluid, said buffer tube projecting below the level of the first fluid, said second fluid being in contact with said first fluid at one end of the buffer tube and with a pressure sensor at the other end of the buffer tube, wherein said second fluid is less dense and immiscible with said first fluid, and wherein preferably the two fluids are chemically inert with respect to each other.

It will be apparent that a contamination trap of the type described can be built in any given size to fit the required needs. However, under most normal applications, the contamination trap will be of relatively small size. For example, the buffer tube will contain from about 1 to about 10 cc of the second fluid and normally will not contain more than about 5 cc of the second fluid. This effect is, of course, due to the relative incompressibility of fluids under pressure. However, more or less of the buffer fluid can be used as required. It will also be apparent that a reservoir tube need only contain sufficient second fluid to activate the sensor, and be of sufficient length to remain below the level of the first fluid. The figure shows, therefore, only a preferred embodiment.

Compositions of the two fluids in the parameters set forth are not critical within the requirements described above. However, for most normal purposes, the first fluid will be comprised of a heavy oil or mercury, and the second fluid will be a material such as a silicone oil. Indeed, most traps will use mercury as a first fluid and a silicone oil as the second fluid because of the great difference in gravities of the two fluids, their relative immiscibility and chemical inertness with respect to each other. Other examples of such fluids include highly halogenated fluorocarbons having the desired density. These materials vary in density sufficiently to allow use as either the first or second fluid, assuming that an immiscible fluid is in contact with said fluorocarbon. Examples of such fluids are chlorofluoroethanes and methanes well known to those skilled in chemical arts.

The invention is more concretely described with reference to the FIGURE and the description below. The description and FIGURE describe an actual model built to fit a Hewlett-Packard quartz sensor pressure gauge. However, it will be realized that the trap is applicable to any gauge which requires contamination-free operation with direct pressure.

Briefly, the FIGURE describes a contamination trap having a pressure entrance above the level of a mercury reservoir into which is inserted a buffer tube filled with a silicone oil. The buffer tube is directly connected by the silicone oil to the quartz crystal for direct pressure readout.

The FIGURE is a representation of the model actually built, wherein 1 is a stainless steel 316 tube, having a reservoir tube 2 attached to the base by means of a weld 3. The base of the tube is threaded as required to fit the particular application 4 and contains an O-ring 5 in order to seal the trap from outside pressure. The particular model built contained 1¼-inch wrench flats 6. The upper end of the tube contained threads 7 which allowed connection to the gauge bulkhead 8. Between the bulkhead and the vessel, provisions are made for an O-ring or similar sealing means 9. To the bottom of the bulkhead is attached a buffer tube 10. The attachment is made by any convenient means such as the threaded connectors shown 11. The reservoir tube 2 extends into the vessel 1 above the level of the first fluid 12, in the case of the model, mercury. The buffer tube 10 is filled with a second fluid less dense and immiscible with the first fluid, in this case silicone oil. In actual operation, pressure will be transmitted through the reservoir tube to the area above the first fluid. The pressure will force the first fluid down, exerting pressure on the second fluid contained in the buffer tube. This pressure will then be transmitted directly to the pressure sensor via the second fluid.

It can be easily seen that contaminants will remain in the first fluid or, if less dense, be contained above it or, if more dense, fall to the bottom of the reservoir and will not enter the buffer tube. When using an extremely heavy fluid, such as the preferred mercury of the instant invention, most contaminants will float upon the mercury and will not become available to clog the buffer tube.

Thus, in operation, the quantity of the pressure transmitting fluid, described herein as the second fluid, is isolated from and buffered from contaminants by the first fluid, such as mercury. During operation, the decrease in pressure through the reservoir tube will merely allow the return of the first fluid to its original level, which is of insufficient height to be withdrawn through the reservoir tube.

It will be apparent that the instant invention has many advantages over existing art. Extremely high pressure will cause no rupture or mechanical failure of internal devices. Relaxation of the pressure will merely allow the fluid to return to its original level. There is no loss in sensitivity through mechanical transmitting devices, as the fluids are in intimate contact one with another and, being incompressible, will transmit the pressure to the sensor accurately and completely. Dirt, water, and other contaminants will be trapped in the first fluid and will not be available to clog the pressure transmitting fluid in the buffer tube.

While a specific embodiment of an improved protective device for gauges has been disclosed in the foregoing description, it will be understood that various modifications within the spirit of the invention may occur to those skilled in the art, and it is intended that no limitations be placed on the invention except as defined by the scope of the appended claims.

I claim:

1. A pressure sensitive contamination trap to protect pressure sensors from water and other foreign materials, comprising a sealed vessel containing a first fluid, said vessel having an intake conduit to the vessel interior above the level of the first fluid, and a buffer tube filled with a second fluid, said buffer tube projecting below the level of the first fluid, said second fluid being in contact with said first fluid at one end of the buffer tube and with a pressure sensor at the other end of the buffer tube, wherein said second fluid is of lower specific gravity and immiscible with said first fluid.

2. The contamination trap described in claim 1 wherein the first and second fluids are substantially chemically inert with respect to each other.

3. A contamination trap as described in claim 1 wherein the first fluid is mercury and the second fluid is a silicone oil.

4. A contamination trap as described in claim 1 wherein said buffer tube has a capacity of from about 1 to about 10 cubic centimeters.

* * * * *

UNITED STATES PATENT OFFICE
CERTIFICATE OF CORRECTION

PATENT NO. : 4,058,015
DATED : November 15, 1977
INVENTOR(S) : Ralph A. Strode

It is certified that error appears in the above-identified patent and that said Letters Patent are hereby corrected as shown below:

On abstract page, Inventor's name, please delete "Stode" at top of page and after Ralph A., and insert therefore --Strode--.

Column 2, line 41, the word "groove" was left out after O-ring.

Signed and Sealed this

Fourteenth Day of March 1978

[SEAL]

Attest:

RUTH C. MASON
Attesting Officer

LUTRELLE F. PARKER
Acting Commissioner of Patents and Trademarks